United States Patent
Daniel et al.

(10) Patent No.: US 9,871,298 B2
(45) Date of Patent: Jan. 16, 2018

(54) RECTIFYING CIRCUIT FOR MULTIBAND RADIO FREQUENCY (RF) ENERGY HARVESTING

(71) Applicant: Palo Alto Research Center Incorporated, Palo Alto, CA (US)

(72) Inventors: George Daniel, Palo Alto, CA (US); Bernard D. Casse, Saratoga, CA (US); Armin R. Volkel, Mountain View, CA (US); Victor Liu, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 534 days.

(21) Appl. No.: 14/582,002

(22) Filed: Dec. 23, 2014

(65) Prior Publication Data
US 2016/0181867 A1  Jun. 23, 2016

(51) Int. Cl.
*H02J 17/00* (2006.01)
*H01Q 9/16* (2006.01)
(Continued)

(52) U.S. Cl.
CPC .............. *H01Q 9/16* (2013.01); *H01Q 1/248* (2013.01); *H01Q 9/26* (2013.01); *H02J 50/27* (2016.02); *H02J 50/20* (2016.02)

(58) Field of Classification Search
CPC .. H01Q 9/16; H01Q 1/248; H01Q 9/26; H02J 50/27; H02J 50/20
See application file for complete search history.

(56) References Cited

U.S. PATENT DOCUMENTS

| | | | |
|---|---|---|---|
| 3,929,594 | A | 12/1975 | Fromson |
| 4,065,364 | A | 12/1977 | Fromson |
| (Continued) | | | |

FOREIGN PATENT DOCUMENTS

| | | |
|---|---|---|
| CN | 102778144 | 11/2012 |
| CN | 103312042 A | 9/2013 |
| (Continued) | | |

OTHER PUBLICATIONS

Aoyama, Takahiko et al. "Energy response of a full-energy-absorption neutron spectrometer using boron-loaded liquid scintillator BC-523", Nuclear Instruments and Methods in Physics Research A 333 (1993) 492-501, 10 pages.
(Continued)

*Primary Examiner* — Jared Fureman
*Assistant Examiner* — Emmanuel R Dominique
(74) *Attorney, Agent, or Firm* — Bever, Hoffman & Harms, LLP

(57) ABSTRACT

A radio frequency (RF) energy harvesting device (rectenna) includes an antenna structure configured to resonate at RF frequencies, and a rectifying circuit that facilitates harvesting multiband RF signals having low energy levels (i.e., tens of mW and below) by utilizing two Zero Bias Schottky diodes having different forward voltage and peak inverse voltage values. Positive voltage pulses from a captured RF signal generated on a first antenna end point are passed by the first diode to a first internal node where they are summed with a second RF signal generated on the second antenna end point (i.e., after being passed through a capacitor), thereby producing a first intermediate voltage having a substantially higher voltage level. Positive voltage pulses are then passed from the first internal node through the second diode to an output control circuit for conversion into a usable DC output voltage.

19 Claims, 8 Drawing Sheets

(51) Int. Cl.
*H01Q 9/26* (2006.01)
*H02J 50/27* (2016.01)
*H01Q 1/24* (2006.01)
*H02J 50/20* (2016.01)

(56) References Cited

U.S. PATENT DOCUMENTS

| | | | |
|---|---|---|---|
| 4,315,873 | A | 2/1982 | Smith et al. |
| 4,779,000 | A | 10/1988 | Ing |
| 5,043,739 | A | 8/1991 | Logan et al. |
| 5,712,166 | A | 1/1998 | Broan |
| 5,905,263 | A | 5/1999 | Nishizawa |
| 8,621,245 | B2 | 12/2013 | Shearer et al. |
| 8,680,945 | B1 | 3/2014 | Wang |
| 2002/0180639 | A1 | 12/2002 | Rickett |
| 2004/0207486 | A1 | 10/2004 | York |
| 2004/0238751 | A1 | 12/2004 | Penn |
| 2008/0049228 | A1 | 2/2008 | Chan |
| 2008/0143192 | A1* | 6/2008 | Sample .............. H02J 17/00 307/149 |
| 2009/0067208 | A1* | 3/2009 | Martin .............. H02J 17/00 363/126 |
| 2009/0152954 | A1* | 6/2009 | Le .............. H02J 17/00 307/110 |
| 2009/0207000 | A1 | 8/2009 | Mickle et al. |
| 2009/0220802 | A1 | 9/2009 | Faber et al. |
| 2009/0284351 | A1 | 11/2009 | Rossman et al. |
| 2011/0242863 | A1* | 10/2011 | Park .............. H01Q 1/248 363/126 |
| 2011/0303850 | A1 | 12/2011 | Barillon |
| 2011/0309686 | A1 | 12/2011 | Scherbenski et al. |
| 2012/0133547 | A1 | 5/2012 | MacDonald et al. |
| 2012/0314541 | A1 | 12/2012 | Matsuura |
| 2013/0076570 | A1 | 3/2013 | Lee et al. |
| 2013/0187830 | A1 | 7/2013 | Warnick et al. |
| 2014/0131023 | A1 | 5/2014 | Raman et al. |
| 2014/0355381 | A1 | 12/2014 | Lai et al. |
| 2015/0214927 | A1 | 7/2015 | Greene et al. |
| 2015/0236551 | A1 | 8/2015 | Shearer et al. |
| 2015/0276489 | A1 | 10/2015 | Cumming |
| 2015/0380973 | A1 | 12/2015 | Scheb |
| 2016/0145214 | A1 | 5/2016 | Douce |
| 2016/0181867 | A1 | 6/2016 | Daniel et al. |
| 2016/0254844 | A1 | 9/2016 | Hull et al. |
| 2016/0336198 | A1 | 11/2016 | Singleton et al. |
| 2016/0359378 | A1 | 12/2016 | Kuhn et al. |

FOREIGN PATENT DOCUMENTS

| | | |
|---|---|---|
| WO | 2007015281 | 2/2007 |
| WO | 2013039926 | 3/2013 |
| WO | 2015038203 | 3/2015 |

OTHER PUBLICATIONS

Flaska, Marek et al., "Digital pulse shape analysis for the capture-gated liquid scintillator BC-523A", Nuclear Instruments and Methods in Physics Research A 599 (2009) 221-225, 5 pages.

Vanier, Peter E., et al., "Directional detection of fission-spectrum neutrons", 1-4244-1302-8/07, 2007 IEEE, 5 pages.

Vanier, Peter E., et al., "Calibration and Testing of a Large-Area Fast-Neutron Directional Detector", Brookhaven National Laboratory, BNL-79632-2007-CP, 8 pages.

Mascarenhas, Nicholas, et al., "Directional Neutron Detectors for Use with 14 MeV Neutrons", Sandia Report, SAND2005-6255, printed Oct. 2005, 32 pages.

Mirenda, Martin, et al., "Ionic liquids as solvents for liquid scintillation technology, Cerenkov counting with 1-Butyl-3-Methylimidazolium Chloride", Radiation Physics and Chemistry 98 (2014) 98-102, 5 pages.

Swiderski, L., et al., "Further Study of Boron-10 Loaded Liquid Scintillators for Detection of Fast and Thermal Neutrons", IEEE Transactions on Nuclear Science, vol. 57, No. 1, Feb. 2010, 6 pages.

Pratap et al., "Plasmonic Properties of Gold-Coated Nanoporous Anodic Alumina With Linearly Organized Pores," Pramana—J. Phys. (Dec. 2014), vol. 83, No. 6, pp. 1025-1033.

Noh et al., Highly Self-Assembled Nanotubular Aluminum Oxide by Hard Anodization, (Jan. 29, 2011), J. Mater. Res., vol. 26, Issue 2, pp. 186-193.

* cited by examiner

RECTIFYING CIRCUIT FOR MULTIBAND RADIO FREQUENCY (RF) ENERGY HARVESTING

FIELD OF THE INVENTION

This invention relates to multiband radio frequency (RF) energy harvesting, and more particularly to a rectifying circuit for an RF energy harvesting device, and to RF energy harvesting systems utilizing these rectifying circuits.

BACKGROUND OF THE INVENTION

A rectenna (rectifying antenna) is a special type of antenna that is used to convert radio wave energy into direct current electricity. Rectennas are used in wireless power transmission systems that transmit power by radio waves. A typical rectenna element consists of a dipole antenna with a diode connected across the dipole elements. The diode rectifies the alternating current (AC) induced in the antenna by the radio waves to produce direct current (DC) power, which is then used to power a load connected across the diode. Schottky diodes are usually used because they have the lowest voltage drop and highest speed and therefore have the lowest power losses due to conduction and switching. Large rectennas consist of an array of many such dipole elements.

There exists a significant motivation to develop rectennas that efficiently capture RF energy. Due to the increasing use of radio frequency (RF) signals to transmit information, the presence of RF energy is almost ubiquitous. Moreover, the unused portions of transmitted RF signals (i.e., portions that are not captured and converted by a receiver) are essentially "wasted" in that the energy transmitted in unused RF signals is absorbed in ambient matter and thus lost. As such, in addition to providing power sources for remote/portable devices, a suitable rectenna capable of efficiently re-converting unused ambient RF energy would reduce overall energy demand by replacing batteries and other remote power sources.

Conventional rectennas capable of converting RF energy to DC power are unable to harvest most ambient RF energy. Conventional rectifying circuits contain a distinct RF matching stage for matching the impedance of the antenna (typically a standard 50 or 75 Ohm antenna) to the input impedance of the rectifying circuit (typically with a strong inductance/reactance in addition to the resistance). Accordingly, existing RF rectennas can only produce usable DC voltages in the presence of high RF power density levels (typically above 1 W/m$^2$), and are therefore typically used in wireless power transmission systems where dedicated high-power transmitters generate RF energy at sufficiently high energies. Ambient RF energy is typically very low (from mW down to μW), and thus the use of conventional RF rectennas for energy harvesting has proven to be insufficient for low-power levels ambient sources. Also, conventional rectennas are single band (i.e., harvest narrow-band RF signals) and are bulky, and therefore not scalable.

What is needed is an RF energy harvesting device (rectenna) that is capable of harvesting ambient RF energy. In particular, what is needed is a rectifying circuit that allows an RF rectenna to harvest multiband RF signal energy having low energy levels (i.e., tens of mW and below), and with high conversion efficiencies.

SUMMARY OF THE INVENTION

The present invention is directed to radio frequency (RF) energy harvesting device (rectenna) including an antenna structure configured to resonate at RF frequencies, and a rectifying circuit that facilitates harvesting multiband RF signals having low energy levels (i.e., tens of mW and below) by utilizing two diodes having different forward voltage and peak inverse voltage values to boost the harvested RF signal to usable voltage levels. The first diode is coupled to a first antenna end point and is implemented using a (first) Zero Bias Schottky diode having a very low forward voltage (e.g., 120 mV or less), a peak inverse voltage of 1.0 V or less, and a reverse current resistance of 5 k Ohms. The second diode is coupled to the second antenna end point by way of a capacitor, and is implemented using a (second) Zero Bias Schottky diode having a forward voltage of 150 mV or less (i.e., equal to or higher than that of the first Zero Bias Schottky diode), and a peak inverse voltage of at least 2.0 V (i.e., higher than that of the first Zero Bias Schottky diode), and a reverse current resistance of at least 10 k Ohms (i.e., higher than that of the first Zero Bias Schottky diode D1). Positive voltage pulses from the (first) RF signal generated on the first antenna end point are passed by the first diode to a first internal node, where they are summed with a second RF signal generated on the second antenna end point (i.e., after being passed through the first capacitor), thereby producing a first intermediate voltage having a substantially higher voltage level than either of the first and second RF signals. Positive voltage pulses from the first intermediate voltage are then passed by way of the second diode to a second internal node, from which the pulses can be collected/converted (e.g., by way of a suitable output control circuit) into a usable direct current (DC) output voltage. By implementing the very low forward voltage first diode in the arrangement described above, the present invention facilitates converting very low energy ambient RF signals (i.e., as low as −40 dB) into pulses having significantly higher voltage levels. Then, by passing these pulses through the higher forward/reverse voltage second diode, the present invention facilitates generating DC output voltages having usable voltage levels.

In accordance with a practical embodiment of the present invention, both the antenna and at least a portion of the rectifying circuit comprises dielectric and/or conductive (e.g., metal) materials that are printed or otherwise conformally disposed on a substrate (e.g., a printed circuit board (PCB) or flexible plastic substrate) using conventional PCB, ink-jet printing, or other fabrication techniques such that the conductive material conforms to surface features of the substrate, thereby minimizing manufacturing costs. In one specific embodiment, the first and second diodes are implemented using discrete (e.g., disposed in surface-mountable packages) Zero Bias voltage Schottky diodes in order to efficiently and reliably produce the desired diode characteristics described above. In possible alternative embodiments, these diodes may be generated using printed circuit component or other fabrication techniques. In some embodiments, the rectifying circuit further includes optional inductors (i.e., either discrete devices or printed circuit inductor structures) that are respectively coupled to the first and second antenna end points. In an exemplary embodiment, these inductors have inductances on the order of 50 nH (which may vary depending on both the target RF frequency and diode characteristics) to facilitate efficient capture of ambient RF signals.

As mentioned above, the rectifying circuit includes an output control circuit that is coupled to the second node and configured to convert the second intermediate voltage into a direct current (DC) output voltage (i.e., by storing the pulse energy passed through the second diode). To facilitate the required conversion, output control circuit comprises a (second) capacitor coupled between the second node and the first antenna end point, and in a specific embodiment the second capacitor has the same capacitive value as the first capacitor. In a practical embodiment where the generated DC voltage is directly applied to a load (e.g., sensing/communications/processing) circuit, the output control circuit includes an RC termination circuit having capacitive and resistive values that are dependent on the applied load. In another practical embodiment where the generated DC voltage is stored for conversion to a regulated system voltage (e.g., by combining the output voltage with the output voltages of one or more additional RF harvesting devices), the output control circuit includes third diode (e.g., identical to the second diode) that is connected between the second node and an output (third) node, and a storage capacitor connected to the output node for storing charge passed through the third diode.

In addition to providing a full-wave rectifying stage that is much simpler than conventional rectifying circuit designs, the present invention facilitates lower manufacturing costs by taking advantage, when possible, of the effective inductance of the antenna. In embodiments that utilize monopole antennas, two discrete inductors are needed to facilitate proper transmission of the captured RF signals to the rectifying circuit. In this case, the first inductor coupled to the first antenna end point and the second inductor coupled to the second antenna end point have the same (common) inductance value, and form a balanced circuit with the antenna and rectifying circuit. However, in some embodiments that utilize dipole antennas, the effective inductances of the two antenna segments are incorporated into the rectenna circuitry by using a type of antenna that can be tuned to provide higher radiated resistance along with high inductive reactance. Of course, when needed, in other optional embodiments the effective inductances of the two antenna segments of a dipole antenna may be enhanced using discrete inductors.

According to other embodiments of the present invention, RF energy harvesting systems comprise multiple RF energy harvesting devices, each configured as set forth above, that are coupled together (i.e., in series or parallel) to produce combined system output voltages. Each energy harvesting device includes an output control circuit that is configured with a third diode and a storage capacitor as set forth above in order to facilitate the generation of a combined system output voltage. In a series-connected arrangement, the plurality of RF energy harvesting devices are connected such that the first antenna end point of at least one RF energy harvesting device is connected to the output node of an adjacent RF energy harvesting device, whereby a voltage level of the system output voltage is maximized. In a parallel-connected arrangement, the output nodes of all of the RF energy harvesting devices are connected to a common system output node, whereby a current level of the system output voltage is maximized.

In alternative embodiments, the RF energy harvesting devices of a given system including either same-sized or different-sized antennas to either maximize RF energy harvesting for a given RF frequency band, or to facilitate RF energy harvesting over a wide range of possible RF frequencies. In one specific embodiment, the antennas of all of the plurality of RF energy harvesting devices have the same size and configuration such that all of the RF energy harvesting devices collect RF energy from RF signals having the same RF frequencies. This same-antenna-size arrangement can be used, for example, to maximize system voltage output when the system is placed in an environment that is known to include abundant RF energy in the targeted RF frequency range. In an alternative specific embodiment, the antennas of all of the plurality of RF energy harvesting devices have different sizes/configurations such that each of the RF energy harvesting devices collects RF energy from RF signals having a different RF frequency range. This different-antenna-size arrangement provides flexibility for reliably generating system output voltages.

According to a presently preferred embodiment, RF energy harvesting devices of the present invention are fabricated using PCB or ink-jet printing techniques on a flexible substrate to provide a low-cost, highly scalable platform that facilitates powering remote sensors or other devices using either pre-existing RF signals (e.g., from ambient Wi-Fi signals) or dedicated charging RF sources. In an exemplary embodiment, an antenna comprises one or more conformal elongated antenna structures (i.e., structures fabricated by dispensing a conductive material, such as silver ink, silver plated nanoparticles or another conductive medium, using one of a variety of printing processes such as screen printing, transfer printing, extrusion, and ink-jet printing such that the dispensed conductive material conforms to surface features of the flexible substrate), where the one or more conformal elongated antenna structures are configured to resonate at targeted RF frequencies. The rectifying circuit includes conductive "traces" (i.e., wires or current paths) that are at least partially formed by dispensing either the same conductive material as that used to produce the antenna, or dispensing a different conductive material. In addition, the rectifying circuit includes one or more circuit elements (e.g., capacitors and resistors) that are either fabricated using printed electronics techniques, or optionally discrete elements that are surface-mounted onto the printed "traces".

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in RF energy harvesting. The following description is presented to enable one of ordinary skill in the art to make and use the invention as provided in the context of a particular application and its requirements. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
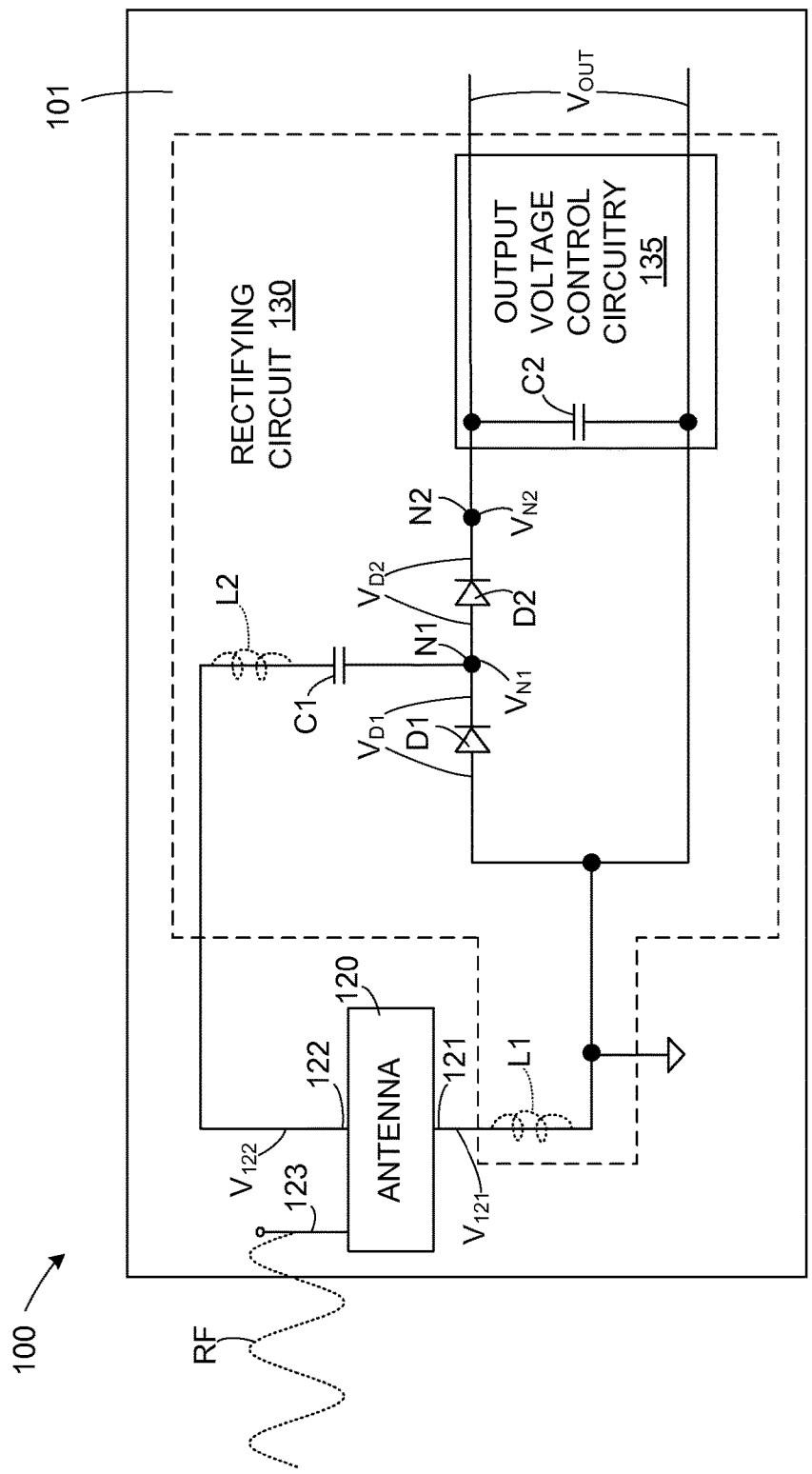
FIG. 1 is a circuit diagram showing an RF energy harvesting device according to an embodiment of the present invention.

FIG. 1 shows a generalized radio frequency (RF) energy harvesting device (aka, a "rectenna") 100 of the present invention. RF energy harvesting device 100 generally includes an antenna 120 and a rectifying circuit 130 disposed on a single substrate 101.

Referring to the right side of FIG. 1, antenna 120 includes a first antenna end point 121, a second antenna end point 122, and at least one elongated conductive structure 123 connected to antenna end points 121 and 122, where conductive structure 123 is configured to resonate at RF frequencies within an associated bandwidth range. Further, as indicated by the signal diagrams shown in FIGS. 2A and 2B, antenna 120 is configured such that a first RF signal $V_{121}$ is generated on antenna end point 121, and a second RF signal $V_{122}$ is generated on antenna end point 122, where RF signal $V_{122}$ is 180° out-of-phase with RF signal $V_{121}$. Antenna 120 is depicted in a generalized form in FIG. 1 using a block and a single conductive structure 123, and this form is intended to indicate antenna 120 may be implemented using any of several possible configurations, such as those discussed below.

Rectifying circuit 130 includes a (first) diode D1 connected between antenna end point 121 and a first node N1, a (first) capacitor C1 connected between antenna end point 122 and the first node N1, a (second) diode D2 connected between the first node N1 and a second node N2, and an output control circuit 135 connected between node N2 and an output terminal of device 100. According to an aspect of the invention, diodes D1 and D2 have different forward voltage and peak inverse voltage values to facilitate harvesting multiband RF signals having low energy levels (i.e., tens of mW and below). In an exemplary embodiment, diode D1 is implemented using a (first) Zero Bias Schottky diode having a very low forward voltage (e.g., 120 mV or less), a peak inverse voltage of 1.0 V or less, and a reverse current resistance of 5 kΩ. Diode D2 is implemented using a (second) Zero Bias Schottky diode having a forward voltage of 150 mV or less (i.e., equal to or higher than that of diode D1), and a peak inverse voltage of at least 2.0 V (i.e., higher than that of diode D1), and a reverse current resistance of at least 10 kΩ (i.e., higher than that of diode D1). Capacitor C1 is either a discrete (e.g., surface mounted) capacitor structure, or a fabricated capacitor structure (e.g., using printed electronics), and has a value determined in accordance with the characteristics (current and voltage) of DC output voltage $V_{OUT}$, and in a practical embodiment has a capacitance value of 10 pF.

Figure 2A:
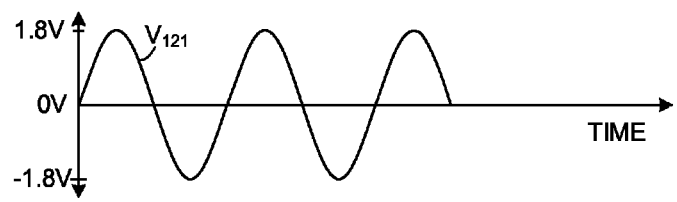
FIGS. 2A, 2B, 2C, 2D, 2E and 2F are diagrams showing signals generated at various locations of the device of FIG. 1.
Figure 2B:
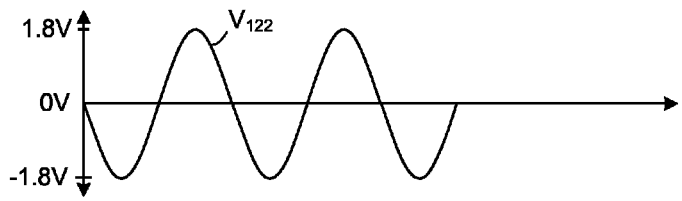
Figure 2C:
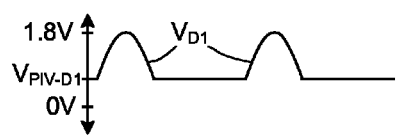
Figure 2D:
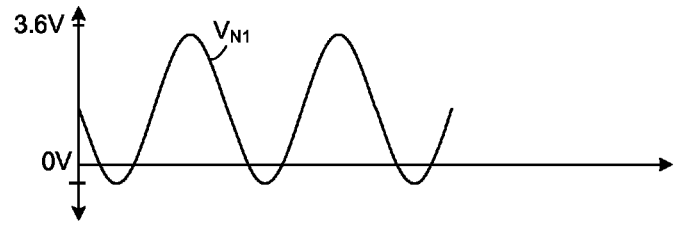
Figure 2E:
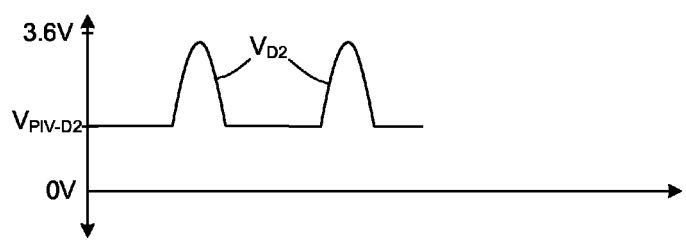
Figure 2F:
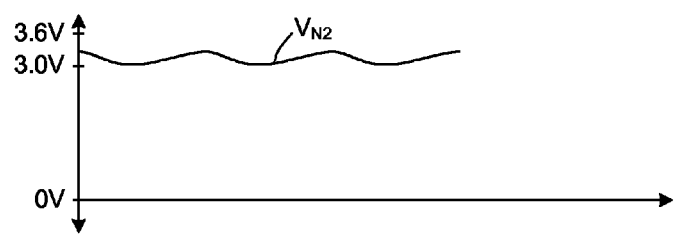

FIGS. 2A-2F are signal (voltage-time) diagrams that illustrate signals generated on RF energy harvesting device 100 during operation. An arbitrary ambient RF signal (RF) is indicated at the left side of FIG. 1. As indicated in FIGS. 2A and 2B, when antenna 120 is configured to resonate at the same frequency as that of ambient signal RF, antenna 120 effectively "captures" some of the energy of signal RF and generates RF signals $V_{121}$ and $V_{122}$ at antenna end points 121 and 122, respectively, which are provided with exemplary voltage values. As indicated in FIG. 2C, because diode D1 is implemented using a Zero Bias voltage diode structure, positive voltage pulses $V_{D1}$ from the (first) RF signal $V_{121}$ generated on the first antenna end point 121 are passed by diode D1 to internal node N1, where they are stored on capacitor C1 in a way that "boosts" RF signal $V_{122}$ (i.e., after being passed through the capacitor C1) to a higher nominal voltage level (approximately two times that of RF signals $V_{121}$ and $V_{122}$), thereby producing a first intermediate voltage $V_{N1}$ at node N1 having a substantially higher voltage level. As indicated in FIG. 2E, positive voltage pulses $V_{D2}$ from the first intermediate voltage $V_{N1}$ are then passed by way of diode D2 to node N2, from which the pulses can be collected/converted (e.g., by way of a suitable output control circuit 135) into direct current (DC) output voltage $V_{OUT}$. By implementing diodes D1 and D2 using Zero Bias voltage diodes having the characteristics mentioned above, the present invention facilitates converting very low energy ambient RF signals (i.e., as low as −40 dB) into DC output voltages having usable voltage levels in the manner shown in FIGS. 2A-2F.

Referring again to FIG. 1, in accordance with a practical embodiment of the present invention, both antenna 120 and at least a portion of rectifying circuit 130 comprises dielectric and/or conductive (e.g., metal) materials that are printed or otherwise conformally disposed on substrate 101. In alternative embodiments, substrate 101 is implemented using either a printed circuit board (PCB) or flexible plastic substrate, and antenna 120 and rectifying circuit 130 are fabricated using conventional PCB, ink-jet printing, or other fabrication techniques such that the conductive material conforms to surface features of substrate 101, thereby minimizing manufacturing costs.

In one specific embodiment, diodes D1 and D2 are implemented using discrete (e.g., disposed in surface-mountable packages) Zero Bias voltage Schottky diodes in order to efficiently and reliably produce the desired diode characteristics described above. For example, in an exemplary practical embodiment, diode D1 is implemented using an SMS7630 Schottky diode produced by Skyworks Solutions, Inc. of Woburn, Mass., USA, and diode D2 is implemented using an HSMS2850 Surface Mount Zero Bias Schottky Detector Diode manufactured by Agilent Technologies of Santa Clara, Calif., USA. In possible alternative embodiments, diodes D1 and D2 may be generated using printed circuit component techniques. That is, diodes produced using existing printed circuit techniques are limited to frequencies below 15 MHz, so current printed circuit techniques may not be utilized to produce diodes having the desired characteristics. However, it is anticipated that future improvements in printed electronic fabrication techniques may facilitate fabricating printed diodes having characteristics suitable for replacing the surface-mounted Zero Bias voltage diodes mentioned above. It is also possible that other fabrication techniques may be developed that would facilitate cost-effective fabrication of suitable diode structures.

As described in additional detail below, in some embodiments rectifying circuit 130 may include inductors to enhance the characteristics of captured RF signals $V_{121}$ and $V_{122}$. FIG. 1 indicates optional inductors L1 and L2 using dotted-lines symbols, where inductor L1 is connected between antenna end point 121 and diode D1, and inductor L2 is connected between antenna end point 122 and capacitor C1. Optional inductors L1 and L2 are implemented either using discrete (e.g., surface-mounted) devices, or fabricated using known printed electronic techniques. In an exemplary embodiment, these inductors have inductances on the order of 50 nH (which may vary depending on both the target RF frequency and diode characteristics) to facilitate efficient capture of ambient RF signals.

Figure 3:
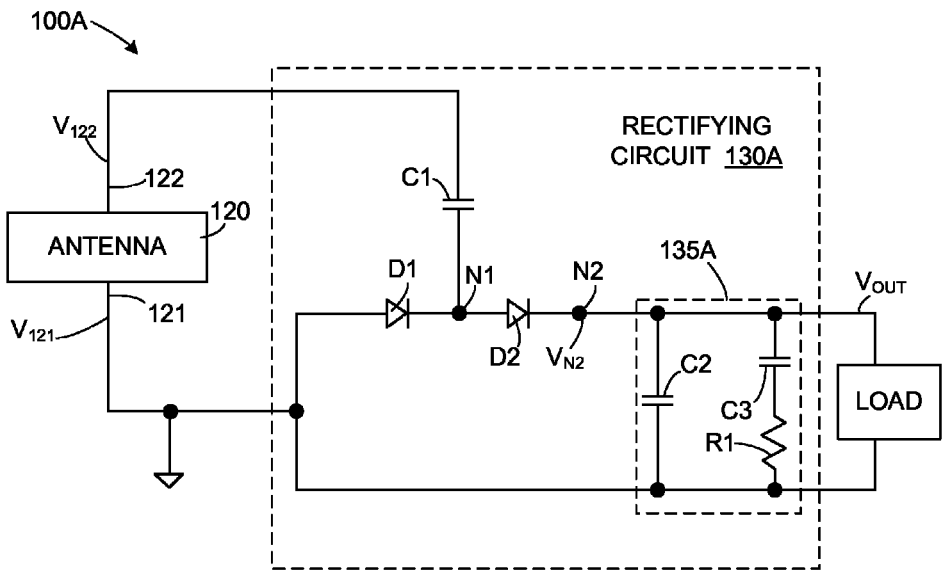
FIG. 3 is a circuit diagram showing an RF energy harvesting device according to another embodiment of the present invention in which output voltage is applied directly to a load.
Figure 4:
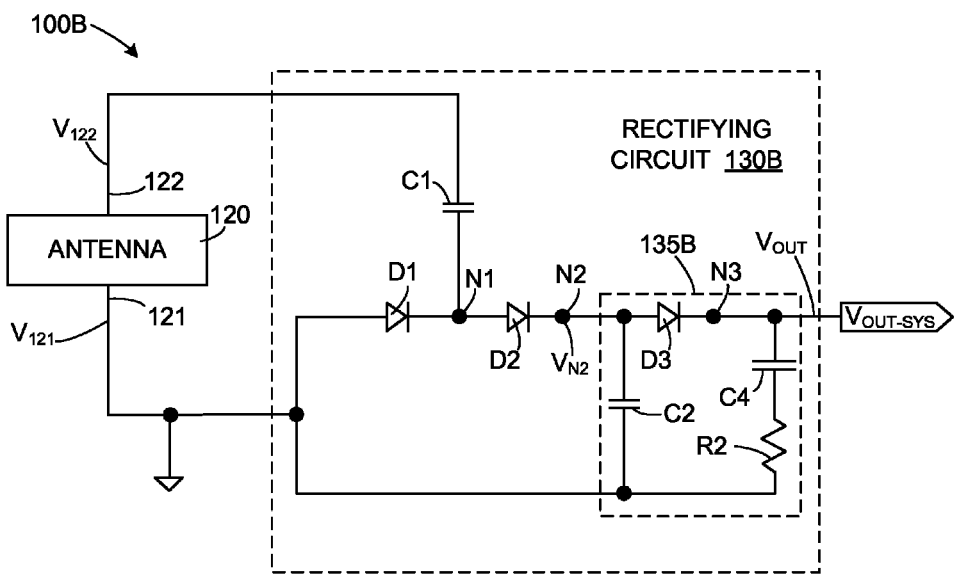
FIG. 4 is a circuit diagram showing an RF energy harvesting device according to another embodiment of the present invention in which output voltage is stored for combining with output voltages from other devices.

FIGS. 3 and 4 are simplified circuit diagrams showing two RF energy harvesting devices 100A and 100B according to two alternative specific embodiments that are respectively configured to apply DC output voltage $V_{OUT}$ either directly to a load (as indicated in FIG. 3), or to a shared system output node (indicated as $V_{OUT\text{-}SYS}$ in FIG. 4). Both RF energy harvesting devices 100A and 100B include an antenna and similar rectifying circuits 130A and 130B (i.e., each of rectifying circuits 130A and 130B includes diode D1 connected between first antenna end point 121 and node N1, capacitor C1 connected between second antenna end point 122 and node N1, and diode D2 connected between node N1 and node N2). In addition, rectifying circuits 130A and 130B are similar in that they respectively include output control circuits 135A and 135B connected to second node N2, wherein each of output control circuits 135A and 135B is configured to convert intermediate voltage $V_{N2}$ generated at node N2 into an associated DC output voltage $V_{OUT}$. Output control circuits 135A and 135B are also similar in that each includes a (second) capacitor C2 that has essentially the same capacitance as capacitor C1 (i.e., both capacitors C1 and C2 have the same capacitive value, e.g., 10 pF). However, as set forth in detail below, RF energy harvesting devices 100A and 100B differ from each other in that output control circuit 135A (FIG. 3) includes a termination circuit formed by capacitor C3 and resistor R1 to facilitate direct application of DC output voltage $V_{OUT}$ to load circuit LOAD, whereas output control circuit 135B (FIG. 4) utilizes a third diode D3 and a storage capacitor C4 to store DC output voltage $V_{OUT}$ for combination with DC output voltages generated by other devices (e.g., as described below with reference to FIGS. 7, 8 and 9).

Referring to FIG. 3, output control circuit 135A includes capacitor C2 connected between node N2 and first antenna end point 121 (in other words, between node N2 and the applied ground potential), and the RC termination circuit including capacitor C3 and resistor R1 connected in series with each other, with the RC termination circuit connected in parallel with capacitor C2. The RC termination circuit is implemented using circuit elements sized in accordance with the characteristics (current and voltage) of DC output voltage $V_{OUT}$, and the size of load circuit LOAD. In an exemplary practical embodiment, utilizing the diode and capacitor component values mentioned above, and assuming a load circuit LOAD having an applied load resistance of 36 KΩ, capacitor C3 may be implemented using a capacitor structure having a capacitance of 0.29 pF, and resistor R1 may be implemented using a resistor having a value of 150Ω.

Referring to FIG. 4, output control circuit 135B includes diode D3 connected between nodes N2 and N3 (which serves as an output node for rectifying circuit 130B), a first terminal of storage capacitor C4 connected to node N3, and a resistor R2 connected between a second terminal of storage capacitor C4 and first antenna end point 121 (e.g., to the applied ground potential). In a practical embodiment, diode D3 is implemented using the same diode element as that utilized to implement diode D2 (e.g., a HSMS2850 Surface Mount Zero Bias Schottky Detector Diode manufactured by Agilent Technologies of Santa Clara, Calif., USA). Capacitor C3 is implemented using a capacitive element sized in accordance with the characteristics (current and voltage) of DC output voltage $V_{OUT}$, and the size and characteristics of the system voltage present on system output node $V_{OUT\text{-}SYS}$. In an exemplary practical embodiment, utilizing the diode and capacitor component values mentioned above, capacitor C3 has a capacitance of 100 pF, and resistor R2 has a nominal resistive value of 1Ω.

Figure 5:
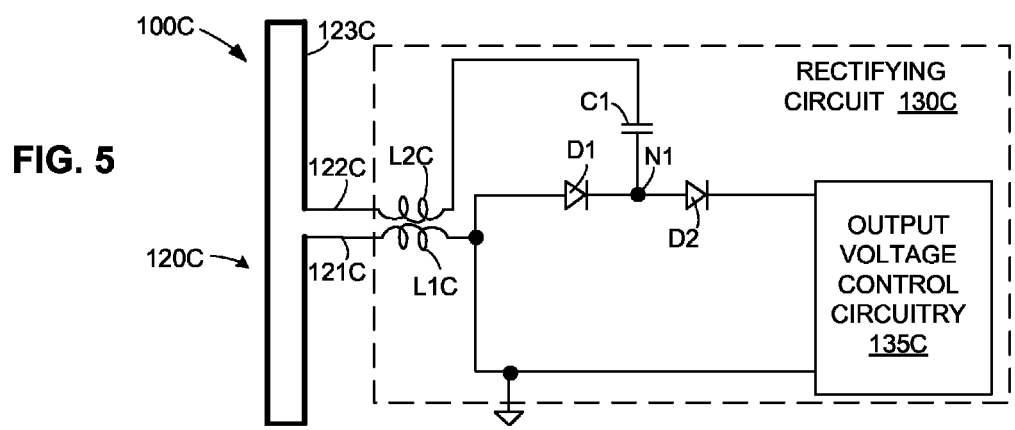
FIG. 5 is a circuit diagram showing an RF energy harvesting device according to another embodiment including a monopole antenna and discrete inductor elements.
Figure 6A:
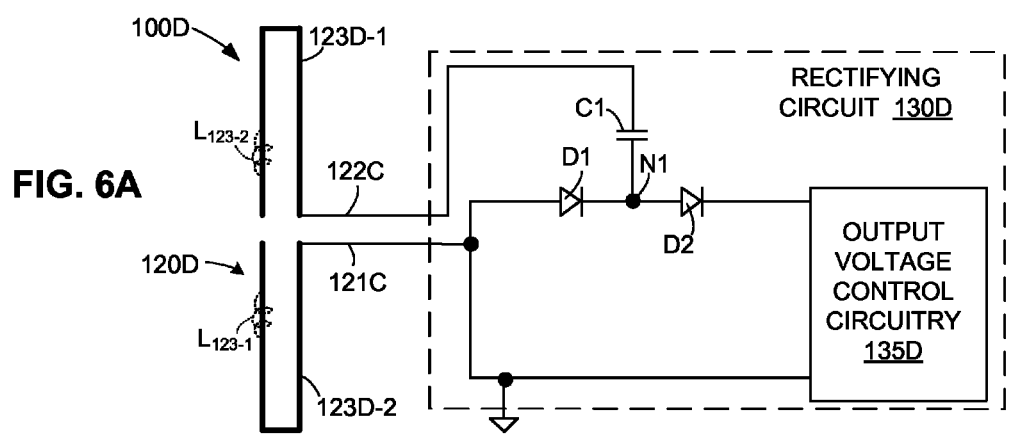
FIG. 6A is a circuit diagram showing an RF energy harvesting device according to another embodiment including a a dipole antenna and zero discrete inductor elements.
Figure 6B:
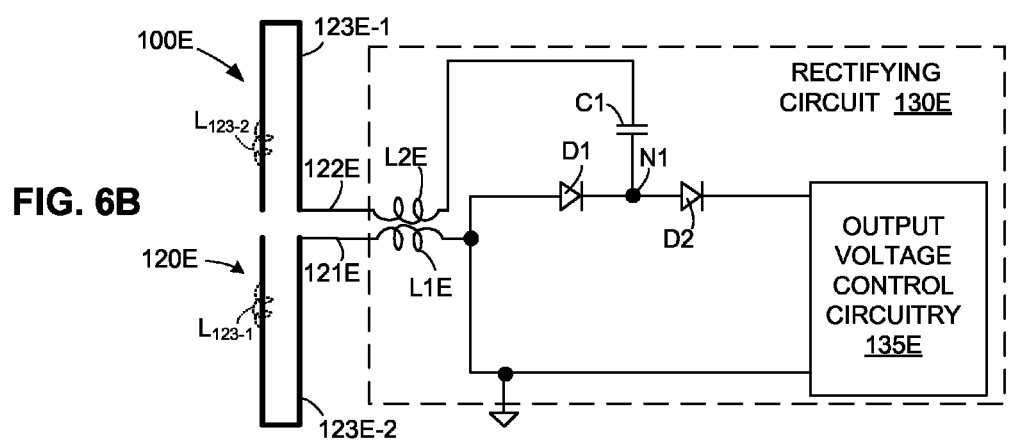
FIG. 6B is a circuit diagram showing an RF energy harvesting device according to another embodiment including a a dipole antenna and two discrete inductor elements.

FIGS. 5, 6A and 6B are simplified diagrams showing device configurations using different types of antennas. Basic antenna configurations are illustrated in these figures for purposes of explanation. Although aspects of the various RF energy harvesting devices described herein are believed to be suitable using a wide range of possible antenna configurations, the inventors currently believe superior results are generated using one or more of the antenna configurations disclosed in co-pending U.S. patent application Ser. No. 14/582,033 entitled "MULTIBAND RADIO FREQUENCY (RF) ENERGY HARVESTING WITH SCALABLE ANTENNA", which is incorporated herein by reference in its entirety.

FIG. 5 is a circuit diagram showing an RF energy harvesting device 100C including a monopole antenna 120C and a rectifying circuit 130C. In this case, rectifying circuit 130C includes two discrete inductors L1C and L2C that are needed to facilitate proper transmission of captured RF signals to the other elements of rectifying circuit 130. Specifically, inductor L1C is coupled between first antenna end point 121C and diode D1, and inductor L2C is coupled between antenna end point 122C and capacitor C1. In one embodiment, inductors L1C and L2C have the same (common) inductance value, and form a balanced circuit with antenna 120C and the elements of rectifying circuit 130C (i.e., capacitor C1, diodes D1 and D2, and output control circuit 135C, which may be implemented using either of the configurations described above with reference to FIGS. 3 and 4).

FIGS. 6A and 6B are circuit diagrams respectively showing RF energy harvesting devices 100D and 100E that include two different dipole antennas 120D and 120E and associated rectifying circuits 130D and 130E. Dipole antennas 120D and 120E differ from monopole antenna 120C in that, whereas monopole antenna 120C includes a single integral antenna structure 123C, dipole antennas include two separate antenna segments (e.g., antenna 120D includes antenna segments 123D-1 and 123D-2, and antenna 120E includes antenna segments 123E-1 and 123E-2).

In addition to providing a full-wave rectifying stage that is much simpler than conventional rectifying circuit designs, the present invention facilitates lower manufacturing costs by taking advantage, when possible, of the effective inductance of dipole antennas. For example, as illustrated in FIG. 6A, first antenna segment 123D-1 has a first effective inductance $L_{123\text{-}1}$ and a second antenna structure 123D-2 has a second effective inductance $L_{123\text{-}2}$, where these two antenna segments are configured such that the first and second effective inductances are substantially equal. In this case, rectifying circuit 130D is constructed using elements that form a balanced circuit with antenna 120D (i.e., that match effective inductances $L_{123\text{-}1}$ and $L_{123\text{-}2}$) such that discrete (additional) inductors are not required between antenna end points 121D and 122D and rectifying circuit 130D. Alternatively, FIG. 6B illustrates a case where, for one reason or another, the effective inductances $L_{123\text{-}1}$ and $L_{123\text{-}2}$ of antenna segments 120E-1 and 120E-2 of a dipole antenna 120E may be enhanced by way of adding discrete inductors L1E and L2E to rectifying circuit 130E (i.e., connecting inductor L1E between antenna end point 121E and diode D1, and connecting inductor L2E between antenna end point 122E and capacitor C1).

Figure 7:
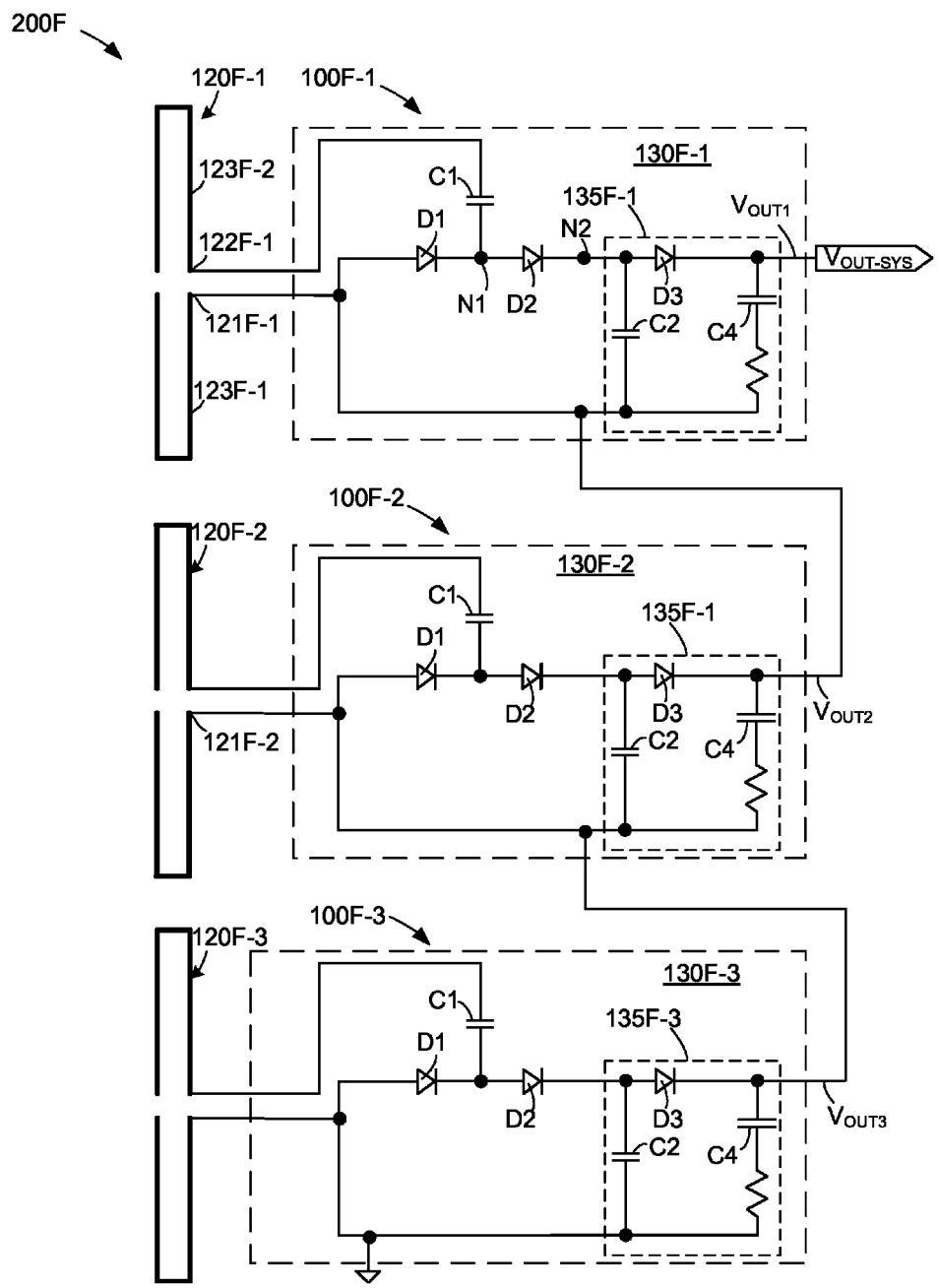
FIG. 7 is a circuit diagram showing an RF energy harvesting system including multiple devices connected in series.
Figure 8:
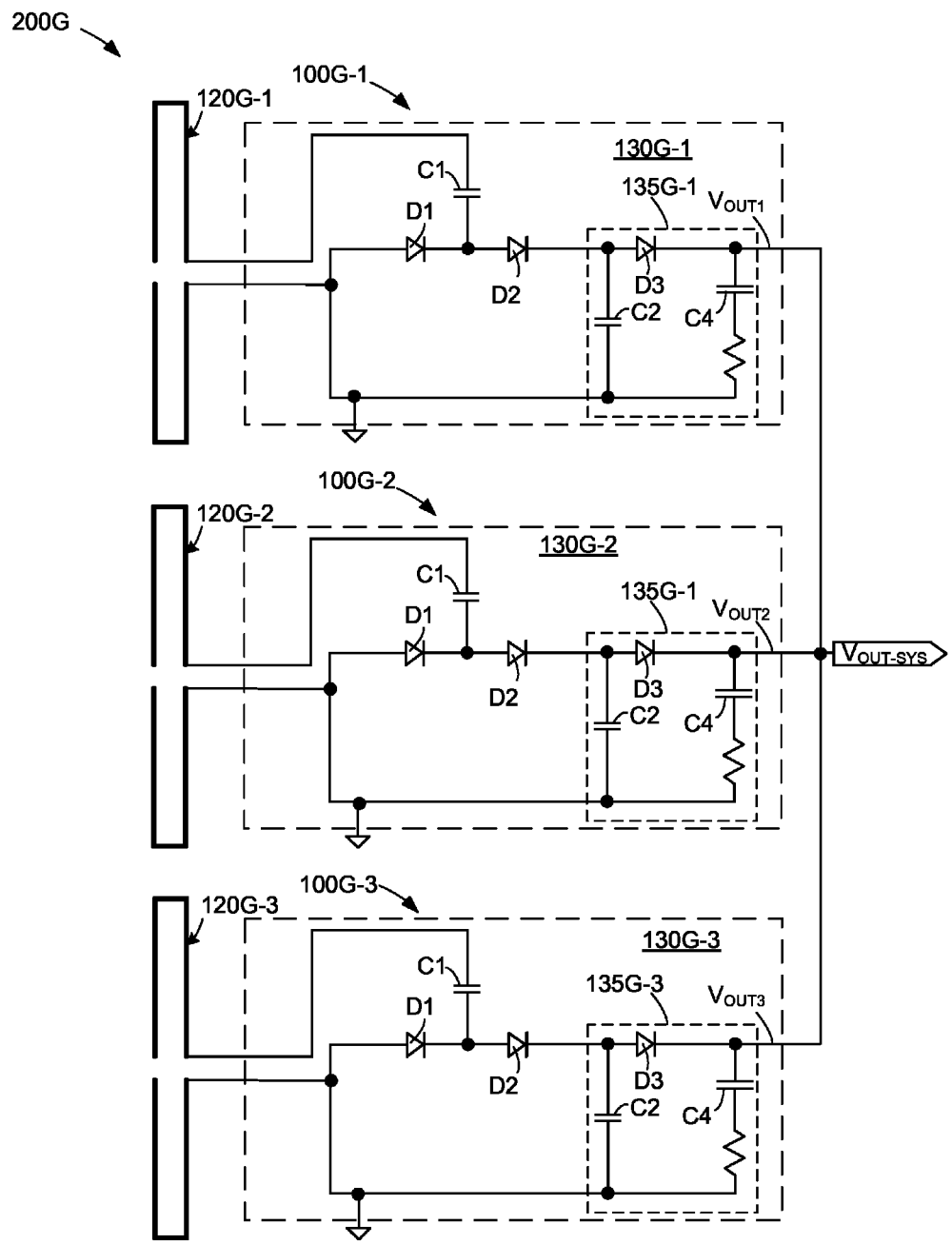
FIG. 8 is a circuit diagram showing an RF energy harvesting system including multiple devices having same-sized antennas and connected in parallel.
Figure 9:
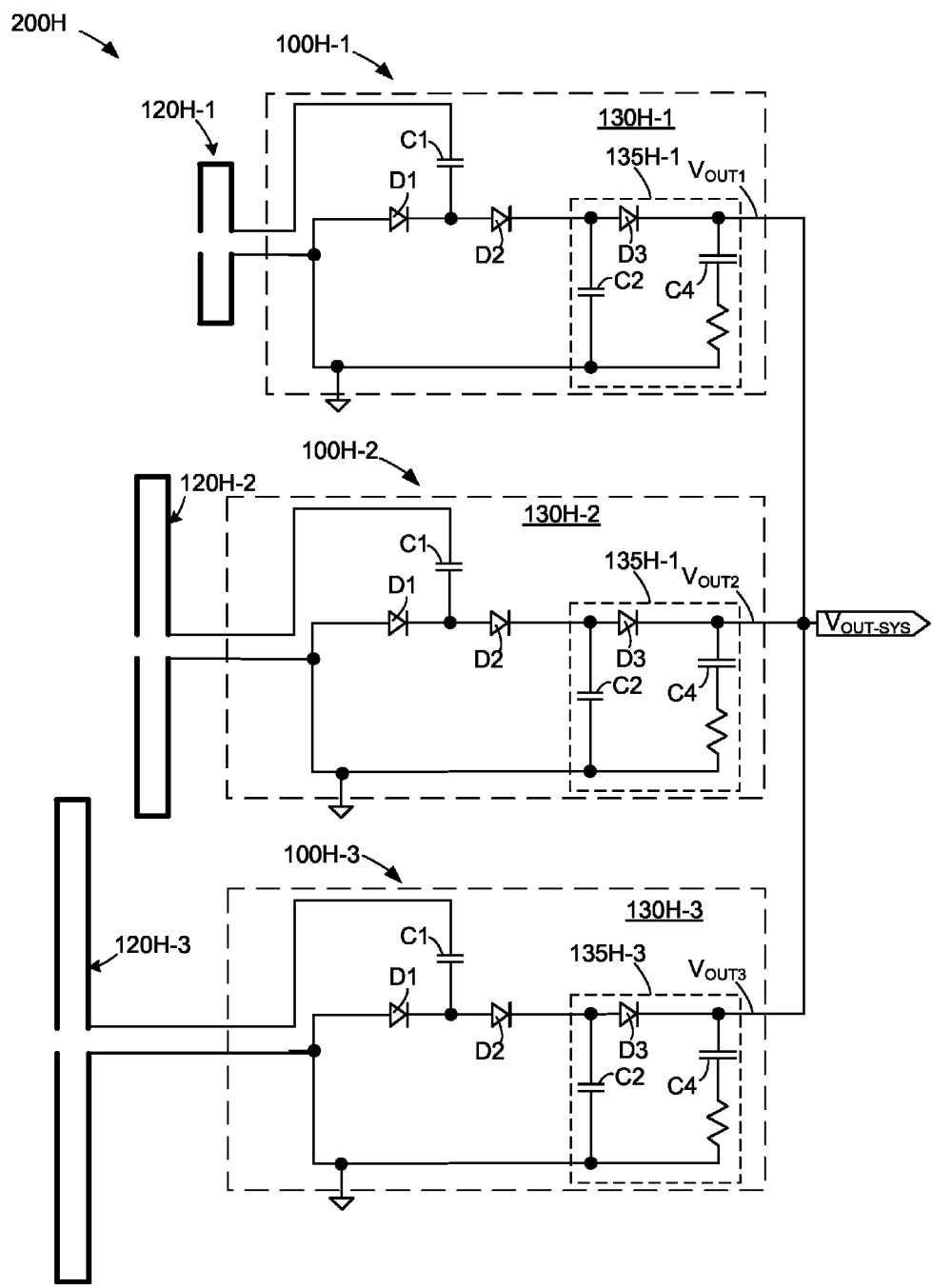
FIG. 9 is a circuit diagram showing an RF energy harvesting system including multiple devices having different-sized antennas and connected in parallel.

FIGS. 7, 8 and 9 respectively show three RF energy harvesting systems, each system including three RF energy harvesting devices configured as set forth above, where the three devices are operably coupled together (i.e., in series or parallel) to produce a desired combined system output voltage. Each of the devices included in the three systems shown in FIGS. 7, 8 and 9, which are described in detail below, include an antenna and a rectifying circuit similar to those described above, where the output control circuit is implemented using one of the two different configurations to optimize either serial or parallel output connections. Each device 100F-1, 100F-2 and 100F-3 includes an antenna that is configured to resonate at an associated RF frequency, and a rectifying circuit that is configured in a manner described above with reference to FIG. 4 such that the energy captured by each device contributes to the combined system output voltage. For example, rectifying circuit 130F-1 of energy harvesting device 100F-1 (FIG. 7) includes an output control circuit 135F-1 that includes a (third) diode D3 and a storage capacitor C2 configured as set forth above with reference to FIG. 4 in order to facilitate the generation of combined system output voltage $V_{OUT\text{-}SYS}$. Note that, although each of the systems described below includes three devices to simplify the description, it is understood that systems may be produced having any number of devices connected together using the techniques set forth below.

FIG. 7 is a simplified circuit diagram showing a first RF energy harvesting system 200F including devices 100F-1, 100F-2 and 100F-3 that are connected in series. According to an aspect of the disclosed embodiment, each energy harvesting device 100F-1 to 100F-3 includes a substantially identical antenna configuration. For example, device 100F-1 includes antenna 120F-1 including an elongated conductive structures 123F-1 and 123F-2 respectively connected to antenna end points 121F-1 and 122F-1, where conductive structures 123F-1 and 123F-2 are configured to resonate at RF frequencies within an associated bandwidth range. In the present embodiment, device 100F-2 includes antenna 120F-2 and device 100F-3 includes antenna 120F-3, where antennas 120F-2 and 120F-3 are substantially identical in configuration with antenna 120F-1 (i.e., such that all three antennas resonate at the same RF frequency, and such that all three antennas generate substantially the same amount of energy).

Each energy harvesting device 100F-1 to 100F-3 also includes a substantially identical rectifying circuit. For example, device 100F-1 includes rectifying circuit 130F-1 including a first diode D1 connected between antenna end point 121F-1 and a first node N1, a first capacitor C1 connected between end point 122F-1 and node N1, and a second diode D2 connected between node N1 and a second node N2. As with the rectifying circuits described above, diode D1 has a lower forward voltage and a lower peak inverse voltage than that of diode D2. Rectifying circuit 130F-1 also includes an output control circuit 135F-1 coupled to node N2 that is configured (i.e., by way of third diode D3, second capacitor C2 that has the same capacitance as capacitor C1, and storage capacitor C4) to convert the intermediate voltage generated on node N2 into DC output voltage $V_{OUT1}$. Similarly, energy harvesting devices 100F-2 and 100F-3 respectively include rectifying circuits 130F-2 and 130F-3 having diodes D1 and D2 and capacitor C1, and output control circuits 135F-2 and 135F-3 including diodes D3 and capacitors C2 and C4) that generate respective DC output voltages $V_{OUT2}$ and $V_{OUT3}$.

According to the series-connected arrangement implemented by system 200F, RF energy harvesting devices 100F-1 to 100F-3 are connected such that DC output voltages $V_{OUT1}$, $V_{OUT2}$ and $V_{OUT3}$ are combined such that system output voltage $V_{OUT\text{-}SYS}$ is maximized. Specifically, first antenna end point 121F-2 of RF energy harvesting device 100F-2 is connected to the output node of RF energy harvesting device 100F-3 (i.e., such that the ground plane of device 100F-2 is DC output voltage $V_{OUT3}$), whereby a voltage level of DC output voltage $V_{OUT2}$ generated at the output node of device 100F-2 is "boosted" by DC output voltage $V_{OUT3}$. Similarly, antenna end point 121F-1 of RF energy harvesting device 100F-1 is connected to the output node of RF energy harvesting device 100F-3, whereby a voltage level of DC output voltage $V_{OUT3}$ generated at the output node of device 100F-1 is "boosted" by DC output voltages $V_{OUT2}$ and $V_{OUT3}$. Hence, the voltage level of system output voltage $V_{OUT\text{-}SYS}$ is maximized by the series arrangement.

FIGS. 8 and 9 are simplified circuit diagrams respectively showing a RF energy harvesting systems 200G and 200H, where each system includes RF energy harvesting devices that are connected in parallel between common ground sources and common system output nodes to maximize the current level of the system output voltage $V_{OUT\text{-}SYS}$. For example, RF energy harvesting system 200G (FIG. 8) includes RF energy harvesting devices 100G-1, 100G-2 and 100G-3 connected in parallel, and RF energy harvesting system 200H (FIG. 9) includes RF energy harvesting devices 100H-1, 100H-2 and 100H-3 connected in parallel. In system 200G, the first antenna end points of RF energy harvesting devices 100G-1 to 100G-3 are connected to a common (single) ground source, and the output nodes of all of RF energy harvesting devices 100G-1 to 100G-3 are connected to a common (single) system output node, whereby a current level of system output voltage $V_{OUT\text{-}SYS}$ generated at the system output node is maximized. Similarly, in system 200H, the first antenna end points of RF energy harvesting devices 100H-1 to 100H-3 are connected to a common (single) ground source, and the output nodes of all of RF energy harvesting devices 100H-1 to 100H-3 are connected to a common (single) system output node. In addition, each energy harvesting device 100G-1 to 100G-3 and 100H-1 to 100H-3 respectively includes a rectifying circuit 130G-1 to 130G-3 and 130H-1 to 130H-3 that are substantially identical to those described above with reference to FIG. 7, with the exception being that each of the energy harvesting devices of systems 200G and 200H is coupled between a ground source and a common system output node.

Systems 200G and 200H (FIGS. 8 and 9) differ in that system 200G is configured to generate high output current for RF energy having a relatively narrow frequency range, whereas system 200H is configured to generate at least some output current over a much broader RF frequency range. That is, each energy harvesting device 100G-1 to 100G-3 includes a substantially identical antenna configuration (e.g., device 100G-1 includes antenna 120G-1, device 100G-2 includes antenna 120G-2, and device 100G-3 includes antenna 120G-3, where all of antennas 120G-1 to 120G-3 are substantially identical). With this arrangement, antennas 120G-1 to 120G-3 of all of RF energy harvesting devices 100G-1 to 100G-3 are configured to collect RF energy from RF signals having the same RF frequencies, thereby maximizing the current of $V_{OUT-SYS}$. Of course, this strategy only works when RF signals having the required RF frequency are available. In contrast, each energy harvesting device 100H-1 to 100H-3 of system 200H (FIG. 9) includes a different antenna configuration (e.g., device 100H-1 includes antenna 120H-1 that is smaller than antenna 120H-2 of device 100H-2, which in turn is smaller than antenna 120H-3 of device 100H-3), whereby each antenna 120H-1 to 120H-3 resonates at a different (unique) RF frequency, thereby producing system output voltage $V_{OUT-SYS}$ with a possibly lower current, but capable of producing at least some current over a wider range of available ambient RF frequencies.

Figure 10:
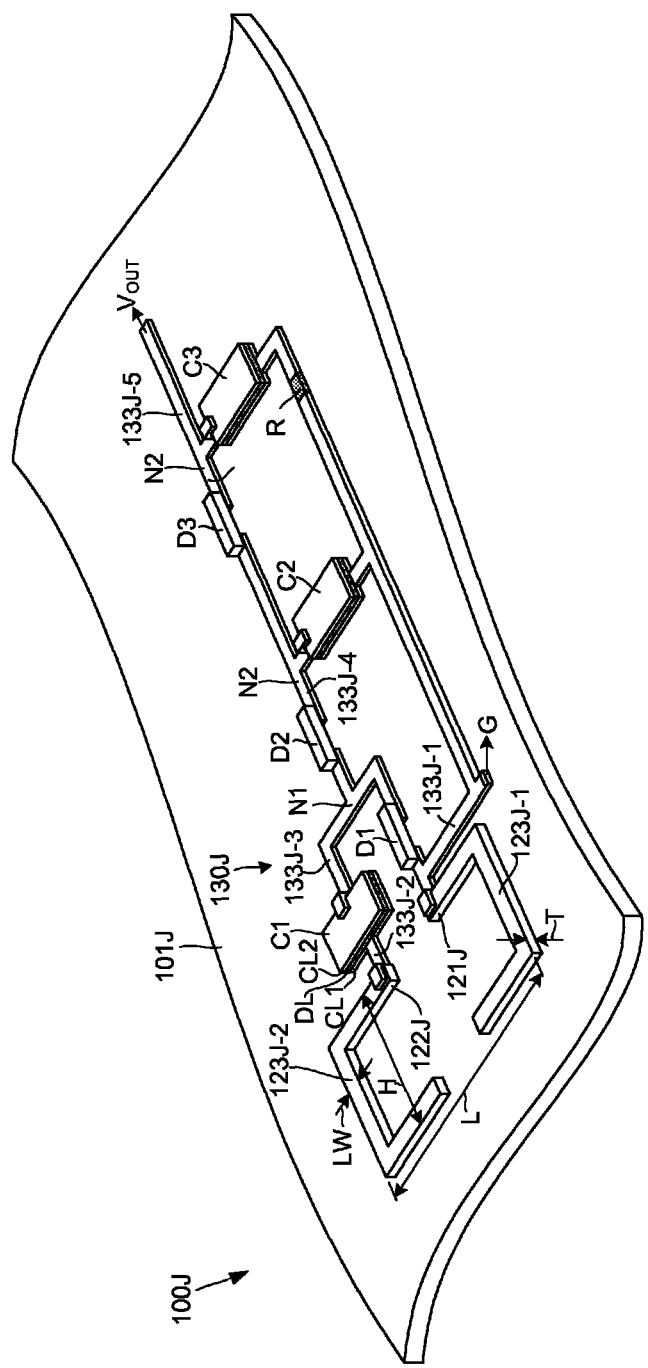
FIG. 10 is a simplified perspective view showing an RF energy harvesting device formed by conductive material dispensed onto a flexible substrate.

FIG. 10 is a simplified perspective view showing an RF energy harvesting device 100J according to a specific exemplary embodiment of the present invention. Note that the structures are not drawn to scale. RF energy harvesting device 100J includes an antenna 120J and a rectifying circuit 130A that are at least partially formed by one or more conductive materials and zero or more dielectric materials that are conformally disposed on a flexible substrate 101J. By forming any of the various RF energy harvesting devices described above using the techniques mentioned below, the present invention is further enhanced to provide a low-cost, highly scalable platform that facilitates powering remote sensors or other devices using either pre-existing RF signals (e.g., from ambient Wi-Fi signals) or dedicated charging RF sources.

Referring to the left side of FIG. 10, antenna 120J includes conformal elongated antenna structures 123J-1 and 123J-2 formed by dispensing a conductive material (e.g., silver ink, silver plated nanoparticles or another conductive medium) using one of a variety of printing processes such as screen printing, transfer printing, extrusion, and ink-jet printing. Utilizing these dispensing techniques results in conformal structures (i.e., such that the dispensed conductive material forming antenna structures 123J-1 and 123J-2 conforms to surface features of flexible substrate 101J upon which they are dispensed). Conformal elongated antenna structures 123J-1 and 123J-2 include conductive metal line segments having suitable dimensions (e.g., a thickness T of 1 μm a line width LW of 2.5 mm) and a suitable configuration (e.g., an overall length L of approximately 150 mm) such that antenna 120J resonates at a targeted RF frequency.

Rectifying circuit 130J includes conductive (e.g., metal) line segments (i.e., "traces", also referred to as wires) 133J-1 to 133J-6 that are at least partially formed by dispensing either the same conductive material as that used to produce antenna 120J, or dispensing a different conductive material. In addition, rectifying circuit 130J includes the circuit elements described above that are either fabricated using printed electronics techniques, or optionally implemented using discrete (e.g., surface-mounted packaged) elements that connected to appropriate printed "traces". For example, diode D1 is connected by way of a portion of trace 133J-1 to first antenna end point 121J. Capacitor C1, which in one embodiment is implemented by a printed dielectric layer DL sandwiched between two conductive layers CL1 and CL2, is connected to second antenna end point 122J by way of trace 133J-2, and to diode D2 by way of trace 133J-3, which also serves as node N1. Diode D2 is connected to second capacitor C2 and to diode D3 by way of trace 133J-4, which also serves as node N2. Second capacitor C2 has the same construction as that of capacitor C1. Diode D3 is connected to third capacitor C3 by way of trace 133J-5, which also serves as node N3. With this arrangement, rectifying circuit 130J operates in a manner consistent with the description provided above with reference to FIG. 3.

Although fabrication costs associated with producing the RF energy harvesting devices/systems of the present invention are minimized using the printing techniques described above, many of the benefits described herein may be achieved using other fabrication techniques. For example, the antenna and rectifying circuit may be fabricated using normal printed circuit board methods on either rigid or flexible substrate. Alternatively, the devices systems may be formed by machining or sintering.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A radio frequency (RF) energy harvesting device comprising:
    an antenna including a first antenna end point, a second antenna end point, and at least one elongated conductive structure connected to the first and second antenna end points and configured to resonate at RF frequencies within an associated bandwidth;
    a first RF signal is generated on the first antenna end point, and a second RF signal is generated on the second antenna end point, the second RF signal being 180° out-of-phase with the first RF signal; and
    a rectifying circuit including:
    a first diode coupled between the first antenna end point and a first node;
    a first capacitor coupled between the second antenna end point and the first node; and
    a second diode coupled between the first node and a second node,
        wherein the first diode has a lower forward voltage than the second diode, and the first diode has a lower peak inverse voltage than the second diode, whereby a first intermediate voltage generated at the first node comprises a sum of positive voltage pulses of the first RF signal that are passed through the first diode and the second AC signal passed through the first capacitor, and whereby a second intermediate voltage is generated at the second node in accordance with positive voltage pulses that are passed from the first node through the second diode.

2. The RF energy harvesting device of claim 1, wherein the antenna and the rectifying circuit comprise at least one of a conductive material and a dielectric material conformally disposed on a substrate with the conductive material conforming to surface features of the substrate.

3. The RF energy harvesting device of claim 1, wherein the first and second diodes comprise Zero Bias voltage Schottky diodes.

4. The RF energy harvesting device of claim 1, wherein the rectifying circuit further comprises one or more inductors coupled to the antenna.

5. The RF energy harvesting device of claim 1, wherein the rectifying circuit further comprises an output control circuit coupled to the second node and configured to convert the second intermediate voltage into a direct current (DC) output voltage.

6. The RF energy harvesting device of claim 5, wherein the output control circuit comprises a second capacitor coupled between the second node and the first antenna end point, said second capacitor having the same capacitive value as the first capacitor.

7. The RF energy harvesting device of claim 6, wherein the output control circuit further comprises a termination circuit connected in parallel with the second capacitor between the second node and the first antenna end point, the termination circuit including a third capacitor connected in series with a resistor.

8. The RF energy harvesting device of claim 6, wherein the output control circuit further comprises a third diode connected between the second node and an output node, and a storage capacitor coupled to the output node and configured to temporarily store a charge generated on the third node.

9. The RF energy harvesting device of claim 6,
wherein the antenna comprises a monopole antenna, and
wherein the rectifying circuit further comprises a first inductor coupled to the first antenna end point, and a second inductor coupled to the second antenna end point, wherein the first and second inductors have a common inductance and form a balanced circuit.

10. The RF energy harvesting device of claim 6, wherein the antenna comprises a dipole antenna including a first antenna segment having a first effective inductance and a second antenna segment having a second effective inductance, the first and second antenna segments are configured with the first and second effective inductances substantially equal.

11. The RF energy harvesting device of claim 10,
wherein the rectifying circuit further comprises a first inductor coupled to the first antenna segment by way of the first antenna end point, and a second inductor coupled to the second antenna segment by way of the second antenna end point, wherein the first and second inductors have a common inductance and form a balanced circuit.

12. A radio frequency (RF) energy harvesting system including a plurality of RF energy harvesting devices, each RF energy harvesting device comprising:
an antenna including a first antenna end point, a second antenna end point, and at least one elongated conductive structure connected to the first and second antenna end points and configured to resonate at RF frequencies within an associated bandwidth range; and
a rectifying circuit including:
a first diode coupled between the first antenna end point and a first node;
a first capacitor coupled between the second end point and the first node;
a second diode coupled between the first node and a second node, wherein the first diode has a lower forward voltage than the second diode, and the first diode has a lower peak inverse voltage than the second diode; and
an output control circuit coupled between the second node and an output node, said output control circuit being configured to convert a second intermediate voltage generated on the second node into a direct current (DC) output voltage, and
wherein the plurality of RF energy harvesting devices are coupled together to generate a combined system output voltage.

13. The RF energy harvesting system of claim 12, wherein the output control circuit of each of the plurality of RF energy harvesting devices comprises:
a second capacitor coupled between the second node and the second antenna end point;
a third diode connected between the second node and the output node; and
a storage capacitor coupled to the output node.

14. The RF energy harvesting system of claim 12, wherein the plurality of RF energy harvesting devices are connected in series such that the first antenna end point of a first said RF energy harvesting device is connected to the output node of a second said RF energy harvesting device.

15. The RF energy harvesting system of claim 12, wherein the output nodes of all of the plurality of RF energy harvesting devices are connected to a common system output node.

16. The RF energy harvesting system of claim 15, wherein the antennas of all of the plurality of RF energy harvesting devices are configured to collect RF energy from RF signals having the same RF frequencies.

17. The RF energy harvesting system of claim 15, wherein the antennas of each of the plurality of RF energy harvesting devices are configured to collect RF energy from RF signals having a unique range of RF frequencies.

18. A radio frequency (RF) energy harvesting device comprising:
a flexible substrate;
an antenna including at least one elongated antenna structure conformally disposed on said flexible substrate and configured to resonate at RF frequencies within an associated bandwidth range, said antenna including a first antenna end point and a second antenna end point; and
a rectifying circuit including:
a plurality of conductive line segments conformally disposed on said flexible substrate;
a first diode coupled by way of a first said conductive line segment to the first antenna end point;
a first capacitor coupled by way of a second said conductive line segment to the second antenna end point;
a second diode coupled to the first capacitor and to the first diode by way of a third said conductive line segment,
wherein the first diode has a lower forward voltage than the second diode, and the first diode has a lower peak inverse voltage than the second diode.

19. The RF energy harvesting device of claim 18,
wherein the first and second capacitors comprise a printed dielectric material disposed between two printed metal layers, and
wherein the first and second diodes comprise surface-mounted Zero Bias voltage Schottky diodes.

* * * * *